United States Patent [19]

Davidson

[11] 3,970,737

[45] July 20, 1976

[54] METAL, PARTICULARLY GOLD, RECOVERY FROM ADSORBED CYANIDE COMPLEXES

[76] Inventor: Raymond John Davidson, 5 Max Michaelis St., Montgomery Park, Johannesburg Transvaal, South Africa

[22] Filed: Oct. 29, 1974

[21] Appl. No.: 518,833

[30] Foreign Application Priority Data

Nov. 23, 1973 South Africa.................. 73/8939
Feb. 22, 1974 South Africa.................. 74/1182
Apr. 18, 1974 South Africa.................. 74/2482

[52] U.S. Cl.................................. 423/27; 423/35; 423/150; 75/118 R
[51] Int. Cl.².................. C01G 3/00; C01G 5/00; C01G 7/00; C01G 53/00
[58] Field of Search............... 423/25, 29, 35, 30, 423/31, 150, 271; 75/105, 106, 118, 108

[56] References Cited
UNITED STATES PATENTS
2,965,441  12/1960  Welton........................ 423/24

OTHER PUBLICATIONS
Zadra et al., U.S. Bureau of Mines, R.I., 4843, 2/52, pp. 1, 3–5.

Primary Examiner—Oscar R. Vertiz
Assistant Examiner—Brian E. Hearn
Attorney, Agent, or Firm—Ladas, Parry, Von Gehr, Goldsmith & Deschamps

[57] ABSTRACT

The invention provides a method of recovering transition or noble metal values, particularly gold and silver values, from a support having absorbed thereon the metal values in the form of an ionic complex, particularly a cyanide ionic complex, by desorbing the metal values with water of low cation concentration such as deionized or softened water. When the cation of the complex is an alkaline earth metal cation then the support is preferably subjected to a pre-treatment with an alkali metal salt solution to effect an exchange reaction before the desorption step.

11 Claims, No Drawings

METAL, PARTICULARLY GOLD, RECOVERY FROM ADSORBED CYANIDE COMPLEXES

This invention relates to metal recovery, particularly gold recovery. The cyanidation process is a well known process for extracting gold values from gold-bearing ores. The process involves finely grinding the ore and then leaching the ore with a sodium cyanide solution. The gold values are leached in the form of aurocyanide ($Au(CN)_2$) ions according to the following reaction:

$$2 Au + 4 NaCN + O_2 + H_2O = 2 NaAu(CN)_2 + 2 NaOH$$

The gold may be recovered from the leach solution using conventional techniques such as electrowinning. Once the bulk of the gold values has been recovered from the leach solution, the problem remains to recover the residual amounts of gold. In the past this has been achieved by, for example, adsorbing the gold values on to an activated charcoal support and then desorbing or solubilising the values from the support using one of the following methods:

1. The activated charcoal is contacted with a boiling mixture of sodium cyanide and sodium hydroxide. The desorbed gold can be recovered from the resulting solution using conventional techniques such as electrowinning or zinc precipitation.
2. The activated charcoal is contacted with anhydrous liquid ammonia. The ammonia can be flashed off the resulting solution to recover the gold.
3. The activated charcoal is contacted with a solution of sodium sulphide and sodium hydroxide. The gold can be recovered from the resulting solution by electrowinning.

The above three methods have the disadvantage that they are expensive and employ unpleasant reagents.

According to the invention, a method of recovering a transition or noble metal values from a support having adsorbed thereon the metal values in the form of an ionic complex including the step of contacting the support with water of low metal cation concentration to desorb metal values.

The water preferably has a low multi-charged cation, e.g. alkaline earth metal cation, concentration. In particular, waters having a metal cation concentration of less than 100 ppm, preferably less than 50 ppm, are preferred. Suitable waters are distilled, deionised and softened waters.

The invention has particular application to metal values in the form of cyanide ionic complexes. In such complexes the metal values will form part of the anionic portion of the complex. In the case of gold, the anionic portion will be the aurocyanide anionic complex, $Au(CN)_2^-$.

It has been found that desorption of the metal values by the low cation water is more effective at elevated temperatures. If higher than atmospheric pressures are used, temperatures as high as 150°C can be used. Furthermore, when the support forms part of a desorption column it is preferable that the length to diameter ratio is high and slow rates of elution are employed.

Any support suitable for adsorbing the metal values in their ionic complex form may be used. A particularly suitable support is charcoal, particularly activated charcoal.

It has been found that when the cation of the complex is an alkaline earth metal, the complex is adsorbed on to the support very much more strongly than when the cation is an alkali metal. This is particularly so in the case of aurocyanide complexes. In fact the degree of adsorption has been found to follow the series Ca>Mg>H>Li>Na>K. Consequently, if the cation of the complex is an alkaline earth metal, particularly calcium, it is preferable to subject the support to a pre-treatment with an alkali metal salt solution prior to water desorption. Such pre-treatment will effectively result in an exchange reaction between the alkali metal and the alkaline earth metal. Such exchange reaction will be enhanced by providing a salt whose anion forms an insoluble or substantially insoluble salt with the alkaline earth metal so that the alkaline earth metal is effectively removed from the system as exchange takes place. Suitable salts are carbonates, oxalates, sulfites and fluorides.

It has further been found that the pre-treatment is rendered more efficient if the solution is basic.

The alkali metal is preferably sodium, potassium or lithium. A preferred pre-treatment solution is a potassium carbonate/potassium hydroxide solution having a basic pH.

The invention finds particular application in the recovery of gold in the cyanidation process. In one form, the cyanidation process involves slurrying the gold bearing ore with a sodium cyanide/calcium hydroxide leach solution and granulated charcoal. The gold is leached in the form of aurocyanide ions and in this form is adsorbed on to the charcoal. The charcoal is screened off and the gold recovered from the charcoal using one of the methods mentioned above. Instead of these prior art methods, the gold may be recovered by elution with low metal cation water according to the invention. Alternatively, the method of the invention may be used to recover residual gold values from the effluents of prior art gold recovery methods.

In an example of the invention, a gold plant effluent was adsorbed on to a commercially available coconut shell granulated charcoal (0,5 - 2mm) support. Adsorption was effected by mixing the effluent with the charcoal followed by drying. The analysis of the loaded charcoal was as given below:

| ELEMENT | Ppm ON LOADED CHARCOAL |
|---|---|
| Au | 3300 |
| Ag | 45 |
| Fe | 1500 |
| Ni | 2500 |
| Cu | 240 |
| Co | 2 |
| Zn | 380 |

The loaded charcoal was placed in an elution column of 0,9 cm. internal diameter and 40 cm length. The loaded charcoal was subjected to a pre-treatment by a 5 weight percent potassium carbonate solution at 50°C, followed by elution with deionised water at 90°C. The results are given in the following Table I:

TABLE I

| Elution volume (ml) | Au (ppm) | Ag (ppm) | Fe (ppm) | Ni (ppm) | Cu (ppm) | Co (ppm) | Zn (ppm) |
|---|---|---|---|---|---|---|---|
| 19  | 1,3  | <1 | 5  | 9   | 2  | <1 | 3  |
| 39  | 1,5  |    | 3  | 11  | 1  |    | 5  |
| 60  | 1,6  |    | 2  | 14  | 2  |    | 5  |
| 80  | 1,8  |    | 2  | 17  | 3  |    | 5  |
| 100 | 2,0  |    | 2  | 18  | 4  |    | 5  |
| 121 | 28   |    | 2  | —   | —  |    | —  |
| 141 | 96   | 12 | <1 | 860 | 35 | <1 | 5  |
| 160 | 144  | 16 |    | 200 | 12 |    | 2  |
| 179 | 185  | 13 |    | 60  | 6  |    | 2  |
| 198 | 213  | 9  |    | 20  | 5  |    | 1  |
| 217 | 235  | 6  |    | 11  | 3  |    | <1 |
| 236 | 228  | 3  |    | 7   | 2  |    |    |
| 255 | 209  | 2  |    | 4   | 2  |    |    |
| 275 | 192  | 1  |    | 3   | 2  |    |    |
| 293 | 170  | 1  |    | 2   | 1  |    |    |
| 312 | 145  | 1  |    | 2   | 1  |    |    |
| 332 | 121  | 1  |    | 1   | 1  |    |    |
| 349 | 92   | <1 |    | 1   | 1  |    |    |
| 370 | 82   |    |    | 1   | 1  |    |    |
| 389 | 65   |    |    | 1   | 1  |    |    |
| 440 | 52   |    |    | 1   | 1  |    |    |
| 423 | 39   |    |    | 1   | <1 |    |    |
| 442 | 29   |    |    | 1   |    |    |    |
| 461 | 20   |    |    | 1   |    |    |    |
| 480 | 13,3 |    |    | 1   |    |    |    |
| 498 | 9,1  |    |    | 1   |    |    |    |
| 517 | 7,0  |    |    | <1  |    |    |    |
| 536 | 5,8  |    |    |     |    |    |    |
| 555 | 5,1  |    |    |     |    |    |    |
| 575 | 4,8  |    |    |     |    |    |    |

Note:
1. Fractions 0 – 100 ml pretreatment
2. Fractions 100 – 575 ml - deionised water elution
3. 25 ml = 1 bed volume Using materials and methods described above, the effect of various pretreatments was investigated. Pretreatments were carried out with a 10 weight percent potassium carbonate solution, a 1,5 weight percent lithium carbonate solution, a ten weight percent sodium carbonate solution, a 10 weight percent ammonium carbonate solution and a 10 weight percent sodium chloride solution. Subsequent elution with deionised water resulted in the following recoveries:

| | |
|---|---|
| Potassium carbonate | 84 percent |
| Lithium carbonate | 68 percent |
| Sodium carbonate | 60 percent |
| Ammonium carbonate | 18 percent |
| Sodium chloride | 10 percent |

From the above it will be noted that potassium carbonate pretreatment proved the most effective. Similar experiments were carried out using various potassium carbonate pretreatments and the results of these experiments can be found in the following table II:

TABLE II

THE OPTIMISATION OF THE CARBONATE PRETREATMENT OF ACTIVATED CHARCOAL CONTAINING 0,3 PER CENT Au LOADED USING GOLD PLANT EFFLUENT

| Pretreatment | Flow velocity (cm/min) | No. of bed volumes (carbonate pretreatment) | Temp. of pretreatment (°C) | Temp. of elution (°C) | Gold recovery |
|---|---|---|---|---|---|
| 1% $K_2CO_3$ | 2,37 | 4 | 50 | 90 | 70% in 24 bed vol. |
| 5% $K_2CO_3$ | 0,74 | 8 | 50 | 90 | 91% in 19 bed vol. |
| 10% $K_2CO_3$ | 2,37 | 8 | 50 | 90 | 48% in 20 bed vol. |
| 0,5% $K_2CO_3$ + 0,5% KOH | 0,74 | ca. ½ | 90 | 90 | 35% in 24 bed vol. |
| 1% $K_2CO_3$ + 1% KOH | 0,74 | ca. ½ | 90 | 90 | 73% in 16 bed vol.<br>82% in 24 bed vol. |
| 3% $K_2CO_3$ + 1% KOH | 0,74 | ca. ½ | 90 | 90 | 88% in 16 bed vol.<br>93% in 24 bed vol. |
| 5% $K_2CO_3$ + 3% KOH | 0,74 | ca. ½ | 90 | 90 | 96% in 16 bed vol.<br>98% in 25 bed vol. |
| 5% $K_2CO_3$ + 3% KOH | 0,74 | 1 | 90 | 90 | 98% in 16 bed vol.<br>99% in 25 bed vol. |
| 10% $K_2CO_3$ + 5% KOH | 0,74 | 1 | 90 | 90 | 94% in 7 bed vol.<br>98% in 12 bed vol.<br>99% in 24 bed vol. |
| 5% $K_2CO_3$ + 10% KOH | 0,74 | 1 | 90 | 90 | 94% in 7 bed vol.<br>99% in 12 bed vol.<br>100% in 22 bed vol. |

NOTE:
All percentages are by weight.

In order to demonstrate the effect of increased temperature on desorption efficiency, 20 bed volumes of deionised water at 90° and at 70°C was used to desorb gold values adsorbed on to an activated charcoal support in the manner described above. In each case a pretreatment with a half bed volume solution of 5% potassium carbonate/3% potassium hydroxide solution was carried out. It was found that elution with the 90°C water resulted in 98% gold recovery as against a recovery of only 73% using the 70°C water.

I claim:

1. A method of recovering metal values selected from gold, silver, copper and nickel from a support having adsorbed thereon the metal values in the form of a cyanide ionic complex, the metal values forming part of the anionic portion thereof, including the step of contacting the support with water of low metal cation concentration to desorb the metal values, the cation of the complex being an alkaline earth metal cation and the support being contacted with an alkali metal salt solution prior to the desorption step.

2. A method according to claim 1, wherein the alkali metal salt solution is selected from a sodium, potassium and lithium salt solution.

3. A method according to claim 1, wherein the anion of the alkali metal salt solution is one which forms an insoluble or substantially insoluble salt with the alkaline earth metal cation.

4. A method according to claim 1, wherein the alkali metal salt solution is selected from a sodium, potassium and lithium carbonate solution.

5. A method according to claim 1, wherein the alkali metal salt solution has a basic pH.

6. A method according to claim 1, wherein the alkali metal salt solution is a potassium carbonate/potassium hydroxide solution having a basic pH.

7. A method according to claim 1, wherein the water is deionized or softened water.

8. A method of recovering gold or silver values from a support having adsorbed thereon the metal values in the form of an alkaline earth metal cyanide ionic complex including the steps of contacting the support with alkali metal salt solution, the anion of the salt being capable of forming an insoluble or substantially insoluble salt with the alkaline earth metal of the complex, and desorbing the metal values from the support with water of low cation concentration.

9. A method according to claim 8, wherein the alkali metal salt solution is selected from a potassium, sodium and lithium carbonate solution having a basic pH.

10. A method according to claim 9, wherein the water is deionized or softened water.

11. A method according to claim 8, wherein the water is deionized or softened water.

* * * * *